United States Patent [19]

Fountain

[11] 4,388,363
[45] Jun. 14, 1983

[54] COMPRESSIBLE PRINTING ELEMENT CONTAINING THERMOSOL LAMINA

[75] Inventor: Roy D. Fountain, Lexington, Mass.

[73] Assignee: W. R. Grace & Co., Cambridge, Mass.

[21] Appl. No.: 175,465

[22] Filed: Aug. 5, 1980

Related U.S. Application Data

[63] Continuation of Ser. No. 15,020, Feb. 26, 1979, abandoned.

[51] Int. Cl.$^3$ ............................ B32B 5/18; B32B 3/00; B41N 1/12
[52] U.S. Cl. ..................................... 428/215; 428/280; 428/282; 428/287; 428/288; 428/290; 428/311.1; 428/316.6; 428/317.3; 428/319.3; 428/317.9; 428/909; 101/401.1
[58] Field of Search .................. 101/401.1, 395, 457, 101/462; 428/319.3, 908, 909, 522, 280, 282, 284, 286-289, 290, 291, 261, 316.6, 317.9, 413, 414, 215, 311.1, 317.3

[56] References Cited

U.S. PATENT DOCUMENTS

| | | | |
|---|---|---|---|
| 3,147,698 | 9/1964 | Ross .................................. | 101/149.2 |
| 3,147,705 | 9/1964 | Broderick et al. ............... | 101/401.1 |
| 3,186,894 | 6/1965 | Liles et al. ......................... | 428/161 |
| 3,238,086 | 3/1966 | Tompkins ......................... | 428/414 |
| 3,652,376 | 3/1972 | Bowden ............................ | 428/249 |
| 3,812,005 | 4/1972 | Katagiri et al. .................. | 428/40 |
| 4,010,128 | 3/1977 | Saggese et al. .................. | 428/908 X |
| 4,093,487 | 6/1978 | Gaworowski et al. .......... | 428/909 X |
| 4,174,244 | 11/1979 | Thomas et al. ................. | 428/909 X |
| 4,214,028 | 7/1980 | Shortway ....................... | 428/319.3 X |
| 4,219,595 | 8/1980 | Sponing .......................... | 428/909 X |

FOREIGN PATENT DOCUMENTS

| | | |
|---|---|---|
| 1211542 | 11/1970 | United Kingdom . |
| 1224028 | 3/1971 | United Kingdom . |
| 1232648 | 5/1971 | United Kingdom . |
| 1233910 | 6/1971 | United Kingdom . |
| 1235823 | 6/1971 | United Kingdom . |
| 1245527 | 9/1971 | United Kingdom . |

OTHER PUBLICATIONS

SP-6600, "Technical Data Sales Bulletin," Schenectady Varnish Co., 6 pages.
Technical Bulletin, Rohm and Haas Co., CM-32, pp. 1-7.

*Primary Examiner*—Alexander S. Thomas
*Attorney, Agent, or Firm*—C. Edward Parker; Edward J. Hanson, Jr.; William L. Baker

[57] ABSTRACT

A compressible printing element that has a thermosol lamina. A thermosol is a thermosetting plastisol, preferably a polyvinyl chloride plastisol containing dioctyl phthalate as a plasticizer and having a di- or tri-acrylate monomer that crosslinks therewith to form a thermoset material preferably in the presence of a peroxide free-radical initiator activated by heat. A phenolic resin is preferably included in the thermosol. The thermosol lamina is resilient and adhered to a compressible lamina, preferably one that is highly porous.

16 Claims, 2 Drawing Figures

COMPRESSIBLE PRINTING ELEMENT CONTAINING THERMOSOL LAMINA

This is a continuation of application Ser. No. 015,020, filed Feb. 26, 1979, now abandoned.

BACKGROUND OF THE INVENTION

The invention relates to a resilient compressible element having at least two lamina, one of which is a compressible layer and the other of which is a thermosol. The preferred compressible material is that shown in U.S. Pat. No. 3,147,698, which patent shows the material used in laminates. U.S. Pat. No. 3,652,376 discloses additional laminates utilizing the compressible element of the aforesaid U.S. Pat. No. 3,147,698. Thermosol materials using polyvinyl chloride plastisol together with the crosslinking monomers 1,3-butylene dimethacrylate and trimethylolpropane trimethacrylate are shown in the sales brochure of Rohm and Hass Company, CM-32, a copy of which accompanies the present application with the Notice of References.

It is an object of the present invention to provide an improved printers packing that will outperform all known packings.

It is the further object of the present invention to provide a new composition of matter that will make possible the accomplishment of the aforesaid object.

A still further object of the present invention is to provide a superior method of manufacturing printers packing and similar printers elements. Such a superior method should have as few disadvantages as possible, for example, substantially eliminating pollution, reducing cost, and conserving energy. The present invention in particular increases the productivity of labor, manufacturing equipment and space.

To give just some view of disadvantages inherent in prior procedures known to have been used in producing printing elements, solvent laid elastomers generally require a number of coating passes or a number of in-line coatings to enable the expeditious removal of the solvent. Elastomers applied by milling have the disadvantage of poor adhesion, trapping air and difficult caliper control. While plastisols are not known to have been used to produce resilient compressible printing elements they would have the obvious disadvantage of being subject to heat deformation, poor solvent resistance and poor impact resistance.

It might be thought that thermosols would also have disadvantages such as instability of solution viscosity and likely precuring prior to good lamination, but surprisingly it has been found that the thermosols are not only easily coated on to the desired compressible laminas but the thermosols can be formed into sufficiently resilient lamina with sufficient integrity to give improved resistance to collapse over long usage compared to the laminate structures of the prior art.

SUMMARY OF THE INVENTION

By an aspect of the invention a new thermosol composition is provided having about 30 to about 95% by weight polyvinyl polymer containing plastisol, about 2 to about 20% by weight poly acrylate monomer crosslinkable with said polyvinyl polymer to form a thermoset polymer and about 2 to about 30% by weight phenolic resin. The thermosol preferably includes a peroxide free-radical intiator. The polyvinyl plastisol polymer is preferably a polyvinyl chloride and the acrylate monomer is preferably a di- or tri-acrylate. The plastisol's plasticizer is preferably dioctyl phthalate present in an amount of about 15 to about 65% by weight of the plastisol.

By yet another aspect of the invention a resilient compressible printing element is provided that has a compressible lamina and a thermosol lamina. Preferably the compressible lamina contains voids and is a fibrous sheet impregnated with an epoxy. The voids preferably comprise at least about 20% of the volume of the compressible lamina. The thermosol is preferably the polyvinyl plastisol and poly acrylate monomer type previously described.

By other aspects of the present invention other laminas of thermosol and compressible material and laminas of woven textile may be added. A thermosol lamina may form an outer working face for the resilient compressible printing element in some preferred constructions.

By other aspects of the invention may material that will crosslink with the polyvinyl polymer of the plastisol to form a thermoset polymer may be used. Further the thermosol could in some instances be replaced by what at present is considered a less desirable flexible material so long as the tensile stress is at least about 800 psi, preferably at least about 1000 psi.

The resilient compressible printing elements of the present invention preferably form press packing laminates. The highly porous compressible lamina is preferably at least 10 mils thick and the thermosol lamina is preferably at least 2 mils thick.

By yet another aspect of the present invention a new and advantageous process is provided for manufacturing a resilient compressible printing element. The process involves simply coating a liquid thermosol coating at least 2 mils thick onto a lamina, solidifying the thermosol coating throughout, plying a second lamina over the solidified thermosol coating, and activating the thermosol coating to adhere the laminas together and thermoset the thermosol. The solidifying is preferably accomplished by heating to cause gelling and said thermosetting is by heating to a higher temperature. The preferred thermosol is the one described above.

DESCRIPTION OF THE PREFERRED EMBODIMENTS

First, a definition of the word theremosol: a thermosol as used in this application means a thermosetting plastisol.

The new thermosol composition of the present invention, in its preferred form, comprises about 30 to about 95% by weight polyvinyl plastisol, more preferably about 70 to about 90% and most preferably about 75 to about 85% by weight. The polyvinyl polymer is preferably polyvinyl chloride and the plasticizer is preferably dioctyl phthalate present in an amount of about 15 to about 65%, more preferably about 25 to about 55% by weight of the plastisol. The composition also contains an acrylate monomer crosslinkable with the polyvinyl polymer to form the thermoset polymer. The acrylate monomer is preferably a di- or tri-acrylate and is preferably present in an amount of about 2 to about 20% by weight, more preferably in an amount of about 3 to about 10% and most preferably about 5 to about 9% by weight of the total composition. The acrylate monomer is preferably trimethylolpropane trimethacrylate. The thermosol composition preferably includes a peroxide, free-radical initiator, preferably present in an amount of 0.01 to 1% by weight. The peroxide is preferably a peroxyketal.

An important component, and in its preferred form, a critical ingredient of the thermosol composition is a phenolic resin. The phenolic resin is preferably present in an amount of about 2 to about 30% by weight, more preferably about 8 to about 15% and most preferably about 11 to about 13% by weight. The phenolic resin is preferably of the thermosetting two-step type. When the phenolic resin is present the composition is, in its thermoset condition, stiffer but still very resilient and flexible and the composition provides better characteristics as a press packing work surface or interlay lamina over plys of resilient compressible material, particularly those plies or laminas made from highly porous fibrous material.

The thermosol composition can also, of course, contain other ingredients such as stabilizers, fillers, pigmenting agents and the like.

Figure 1:
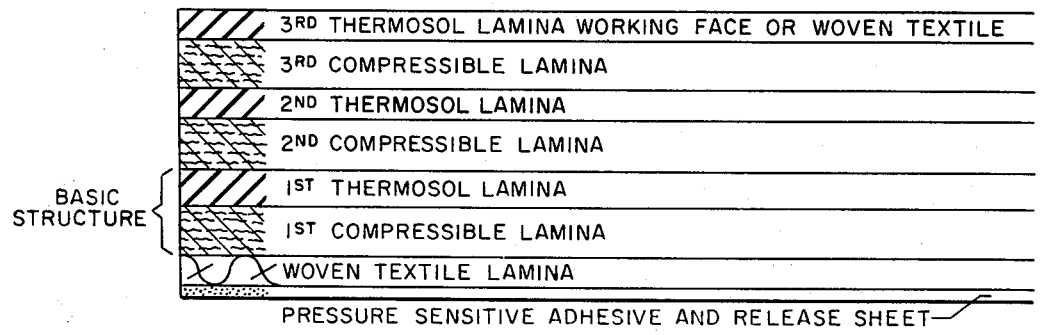
FIG. 1 is a diagrammatic cross section view of a resilient compressible printing element laminate of the present invention labelled to assist easy following of the description.

Turning now to a detailed description of the resilient compressible printing element which is especially a press packing laminate, one embodiment is shown in FIG. 1. The labeling in FIG. 1 is particularly designed to show the basic structure and indicate additional laminas that may be added to expand the usefulness of the present invention. The order designations of the laminas, 1st, 2nd and 3rd, are strictly for illustrative purposes and not to depict any required order of assembly.

The basic structure is a thermosol lamina which is preferably directly adhered to a compressible lamina. The preferred theremosol composition is the one described earlier. The thermosol material containing the phenolic material is adhesively very aggressive, particulary with regard to the epoxy impregnated compressible laminas. Epoxy impregnated laminas are usually very difficult to obtain good adherence with.

The compressible lamina is preferably that shown in U.S. Pat. No. 3,147,698 which is a highly porous velted fibrous sheet impregnated with an elastomeric material. The preferred elastomeric impregnant is one that includes an epoxy resin. Other compressible materials having voids therein can also be used; for example, impregnated paper materials, foamed lamina and even other material such as cork laminas can be used as compressible layers. The voids preferably comprise at least about 20% of the volume of the lamina. While not preferred, the compressible lamina itself can be a composite material formed of two or more laminas or plies.

As shown in FIG. 1, the basic structure can have a woven textile secured to the compressible lamina of the basic structure. The woven textiles used to date are rubber impregnated and in order to provide the desired adhesion to the textile a rubber adhesive layer about 2 mils thick is used to secure the textile to the compressible lamina. However, a preferred securing adhesive layer would be a thermosol. The textile gives additional lateral strength to the laminate. A pressure sensitive adhesive is then applied to the exposed face of the woven textile and this is covered with a release sheet. The thus constructed resilient compressible printing element would normally be utilized by removing the release sheet and sticking the element to the impression cylinder with the thermosol lamina facing the type face. A draw sheet or tympon sheet would usually be engaged over the thus exposed 1st compressible lamina, looking at FIG. 1. However, the thermosol lamina in preferred embodiments can itself function as an excellent working surface and is a considerable improvement in press packing elements, in this sense, eliminating the need for draw sheets and the like. The compressible lamina provides for the good compressibility of the printing element and the thermosol lamina enhances this even more than the prior art facings, in ways not entirely understood.

It is also frequently desired to build up multiple layers of compressible laminas alternating with laminas of thermosol. It has been found that the individual lamina of compressible material should preferably be between about 10 and about 50 mils thick, more preferably about 20 and about 30 mils thick to give optimum compressibility qualities. Preferably, the individual thermosol lamina is at least about 2 mils thick and more preferably it is held to about 5 to about 75mils thick, most preferably about 10 to about 20 mils thick, particularly when employed with multiple compressible plies. The thermosol's thickness contributes to both overall laminate thickness and the quality of impact resistance.

To build up the multiple alternating layers it is preferable to join each compressible lamina to the next adjacent compressible lamina by means of directly engaging each with the opposed faces of a single thermosol lamina without the use of or necessity for intervening layers or means. Thus, 1st, 2nd and 3rd compressible laminas may be joined together by 1st and 2nd thermosol laminas as shown in FIG. 1. If a thermosol working face is desired this composite structure or subassembly can be faced with a thermosol on one face. If desired for lateral strength the other face of the sub-assembly may be faced with a woven textile and pressure sensitive adhesive as previously described and as shown in FIG. 1. Alternatively the thermosol working face may be replaced with a woven textile working face. The woven textile can be secured by rubber adhesive to the compressible lamina or in proper instances and preferably by a thermosol.

Obviously, only several variant constructions of the resilient compressible printing element of the present invention have been described. Many others are possible. In some applications it might be desirable to add additional alternate intermediate laminas of compressible material and thermosol or even other materials such as, for example, dimensionally stabilizing woven textiles and it will be obvious to those of ordinary skill in the art how this can be done using the description given in this patent application.

Another aspect of the resilient compressible printing element which is unexpected is that it can have a lamina with a tensile stress at least as high as about 800 psi or even the more preferred at least as high as about 1000 psi disposed between the printing member or other impinging force member and the compressible lamina and still have the compressible operate effectively. This is admirably done by the thermosol lamina of the present invention but it is within the scope of the invention to cover any resilient compressible printing element having a new lamina with such unexpected characteristics. Tensile stress as used in this application is to be understood as determined as ASTM D142-61T.

Figure 2:
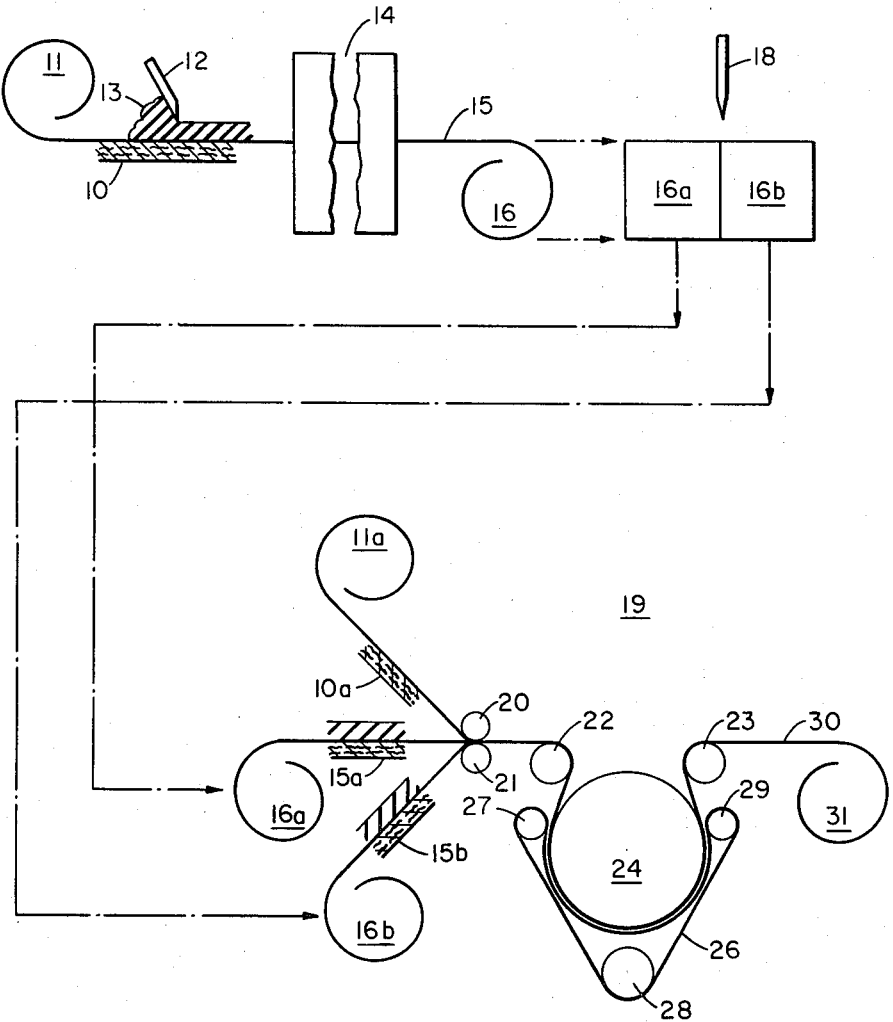
FIG. 2 is a schematic diagram of a preferred method for carrying out the invention.

Turning now to a brief description of the process of the present invention for manufacturing a resilient compressible printing element, it will be understood that in a preferred form, the thermosol coating such as the one previously described in this application is applied as a liquid by coating onto a lamina such as the compressible lamina previously described. A preferred form of the process is shown in FIG. 2. As shown in FIG. 2 the compressible lamina 10 may be withdrawn from a roll 11. The thermosol coating would be applied by the simplest method giving a substantially uniform coating thickness, as illustrated by the knife coater 12 and the bank of thermosol 13. The coated lamina 10 is passed through an oven 14 where it may be heated to between about 200° F. and 220° F. to cause gelling and the formation of a solid thermoplastic material. This laminate 15 is then rolled up in roll 16. The procedure of forming laminate 15 is considered to be a first stage 17 of the process. This laminate 15 would be the basic structure of FIG. 1 before it is thermoset and could, of course, be thermoset in this configuration.

The process will now be described in terms of the preferred embodiment, illustrated in its essential features in FIG. 2, for forming the assembly of FIG. 1 when the two outer faces are of woven textile. Only the three compressible laminas secured together by two thermosol laminas subassembly, formation is illustrated in detail in FIG. 2 with a word description of how the additional laminas are applied being given because this is basically considered to be done according to prior art procedures.

To form the subassembly laminate the roll 16 is shown in FIG. 2 to be divided into two rolls 16a and 16b by cutting means 18. Rolls 16a and 16b are then positioned for unwinding and processing in a second or curing stage 19 of the process. A roll 11a such as original roll 11 is positioned to be unwound providing a lamina 10a to be plied with the laminates 15a and 15b as illustrated in FIG. 2. Guide rolls 20 and 21 may be provided for directing the feeds into parallel relation. Direction change rolls 22 and 23 may be provided for directing the composite about curing drum 24. The curing drum may be operated at a temperature of 300° F. to 320° F. at its face. It has been found preferable to engage the lamina 10a directly against the curing drum 24 to reduce the risk of blisters forming at its interface with the thermosol layer to which it is to be joined. Both laminates 16a and 16b preferably have their thermosol laminas facing toward the curing drum. This orientation brings about a curing of the thermosol laminas from their unattached faces inwardly. Thus a good adherence of the thermoplastic thermosol composition is achieved with the adjacent compressible laminas being pressed against it before the thermosol becomes thermoset. The plied composite of lamina 11a and laminates 16a and 16b is in contact with the surface of the drum for a time sufficient to bring about the adherence of the composite and curing of the thermosol, approximately 5 minutes in the Examples that follows. The composite is pressed together and against the drum 24 by an enless rotocure belt 26 which is held in position by rolls 27, 28 and 29. The newly formed composite or subassembly laminate 30 is then rolled up in a roll 31. It may be necessary to further heat the laminate 30 after its formation to assure the complete curing of the thermosol. This can be done by passing the laminate 30 through the oven 14. Many other curing devices and procedures could obviously be employed but in these preferred forms would use the principles of the presently preferred detailed process just described. It is, for example, felt that it is of importance to cure the thermosol laminas from their open or exposed faces inwardly for best results.

To apply the outer woven textile laminas to the outer faces of the subassembly 30 just formed at stage 19 the roll 31 may be positioned as roll 11 in stage 17 and drawn past knife coater 12 where a rubber adhesive is applied as a solvent cement to its outer face to a thickness of about 2 mils. The rubber coated composite is passed through the oven 14 to remove the solvent and then the textile is substantially immediately laid over the exposed face of the rubber and pressed thereon by passing between two rolls after which the composite is wound up. The composite is then turned over and a woven textile is applied to the other side of the subassembly 30 in the manner just described for application of the fist woven textile. Thereafter a pressure sensitive adhesive is applied over one of the textile faces by passing this latest composite back through stage 17 but a release sheet is applied over the exposed face of the pressure sensitive adhesive. It is preferable to use a thermosol to secure the woven textile to the subassembly 30 but its formulation for the rubber impregnated woven textiles is not yet perfected.

If an outer face of the resilient compressible printing element is to be a thermosol working face then the roll 11a of stage 19 of FIG. 2 would be coated on its face toward the curing drum 24 with a cured thermosol lamina. This cured thermosol laminate is formed as shown in stage 17 except the roll 16 is rerun through stage 17 without the operation of the coater 12 and with the oven operated at about, for example, 340°–350° F. to cure the thermosol. The laminate 15 with the thermosol cured is then placed in stage 19 in the position of lamina 10a and fed into the composite with the cured thermosol lamina disposed against the curing drum 24 and the exposed face of the compressible lamina against the thermosol lamina of laminate 15a. A woven textile can be applied to the side of the composite opposite the working face in the manner previously described for applying such a woven textile lamina.

Variations in the process to produce other desired combination structures will be obvious to those of ordinary skill in the art. In addition it is obvious that the process itself can be variously modified for convenience, such as, for example, cutting the press packing laminate to size rather than rolling it up in roll 25 or providing alternative coating as curing procedures.

The invention is further illustrated by the following examples:

EXAMPLE 1

A thermosol composition was prepared by charging the following ingredients in the order in which they are listed to a reactor while stirring. The reactor was maintained at 75° F. during the charging sequence and the rate of charging was as rapid as reasonably possible allowing for their even dispersion within the reactor.

|  | Parts | % of Total Composition |
|---|---|---|
| 1. Dioctyl phthalate | 60 | 78.7 |
| 2. Polyvinyl chloride resin, dispersion grade (Geon 121, B. F. Goodrich) | 100 |  |
| 3. Phenolic resin (SP6600, Schenectady Chemical, Inc.) | 25 | 12.3 |

-continued

|  | Parts | % of Total Composition |
|---|---|---|
| 4. Trimethylol propane trimethacrylate monomer (X980, Rohm and Haas) | 15 | 07.4 |
| 5. Stabilizer, barium-cadmium-zinc (6V6A, Ferro Chemical Corp.) | 3 | 01.5 |
| 6. 40% organic peroxide on inert filler (Luperco 231XL, Pennwalt Corp.) | 0.3 | 00.1 |
|  | 203.3 | 100% |

After complete mixing which required approximately 45–60 minutes the thermosol composition was a thick liquid having the viscosity of about 20,000–30,000 cps and ready for use. In actuality, the thermosol compound was retained in barrels for about 3 days at ambient conditions prior to use. A highly porous felted fibrous sheet impregnated with an elastomeric material Buna N latex and an epoxy resin that is a condensation product of epichlorohydrin and bisphenol A which is crosslinked with polyamide, was prepared in general accordance with U.S. Pat. No. 3,652,376, the contents of which are incorporated herein by reference.

As is illustrated in FIG. 2, a 25 mil thick sheet of the highly porous compressible material was drawn from a roll and through coating station or state 17. A conventional knife coater 12 applies the thermosol liquid which is maintained in a bank 13 at the knife blade in conventional manner. The thermosol was applied in a single pass to a thickness of 12 to 14 mils and passed immediately through an oven for a dwell time of 5 minutes. The thermosol was gelled to a non-tacky solid in the oven. After the now 2-ply laminate exited the oven it was rolled up. The coated material was then cut into two rolls. This was actually done by unrolling part of a roll and cutting it off rather than bisecting a roll as depicted for illustration in FIG. 2.

The thus formed and identical laminates were then positioned in relative position as depicted in FIG. 2 and drawn from their respective rolls as illustrated in FIG. 2 with their thermosol laminas facing toward the curing drum 24. A compressible lamina identical to the one described above was then fed between the two laminate sheets and the drum 24 as also illustrated in FIG. 2. The thermosol coated sides of the laminates thus engaged with unfaced exposed compressible lamina faces. The surface of a curing drum 24 was maintained at about 320° F under a belt tension (belt 26) of about 10,000 lbs. to provide a firm pulling together of the faces of the separate plies producing an adhered composite having a thickness of 100 mils.

This composite was then run back through the oven of station 17 operated at about 345° F. for a dwell time of about 5 minutes to assure cure of the thermosol. The now thoroughly cured composite was then returned to station 17 and coated with solution of nitrile rubber adhesive to a thickness of 2 mils and passed through the oven 14 operated at about 220° F. with the same in oven time as before to remove the solvent. A 10 mil thick woven textile impregnated with nitrile rubber was applied over the nitrile rubber adhesive and firmed thereto by passing between closely spaced rollers. The thus formed composite was turned over and run back through station 17 and the procedure just described repeated except the woven textile was 5 mils thick. The now formed composite was then passed back through station 17 and an acrylic pressure sensitive adhesive was applied to the exposed face of the 5 mils thick textile to a thickness of approximately 2 mils and passed through the oven at approximately 310°–330° F. for a 5 minute dwell time and a release sheet applied thereover in the same manner as the previous application of the woven textiles.

The press packing laminate of Example 1 was tested on a standard letterpress machine and found to perform in a superior manner to present commercial press packing.

EXAMPLE 2

The procedure of Example 1 was repeated except that a roll of the gelled thermosol laminate produced in the first station 17 of the process was cured by being passed back through the oven of station 17 without being additionally coated. The oven was operated at about 345° F. and the laminate had a dwell time of about 5 minutes in the oven. The thus formed cured laminate was then taken to the compilation-curing station 19 and positioned in place of roll 11a with the cured thermosol lamina facing the curing drum 24. This composite was then run back through the oven of station 17 operated at 340° to 350° F. for a dwell time of 5 minutes to assure cure of the thermosol. The now thoroughly cured composite was then returned to station 17 and a woven textile lamina and pressure sensitive adhesive and release sheet were added as described in Example 1 to provide the laminate of FIG. 1 having the thermosol working face.

The press packing laminate of Example 2 tested on a standard letterpress machine and found to perform in a superior manner to present commercial press packing.

EXAMPLE 3

The procedure of forming the cured laminate of the basic structure of FIG. 1 was carried out as described in Example 2 and then the woven textile, pressure sensitive adhesive and release sheet were added to the exposed face of the compressible lamina as described in Example 2 to produce a more basic press packing laminate having only the basic structure plus sub-laminas directly adjacent to the compressible lamina.

The press packing laminate of Example 3 was tested on a standard letterpress machine and found to perform in a superior manner to present commercial press packing.

A single thermosol lamina 60 mils thick was formed and tested on a Scott Tester and found to have a tensile of 1,600–1,900 p.s.i., an elongation of 200–250%, and a tensile stress at 100% elongation of 1,200–1,500 p.s.i. and tested on a durometer and found to have a Shore A hardness of 83–85.

From a processing standpoint, the procedure of the present invention eliminates the use of solvents for the laminas that are thermosol and also the necessity of using adhesives of different characteristics on the facing surfaces the compressible lamina and the resilient lamina (the thermosol) to provide an adhesion between them that will withstand the long term use to which printing elements are normally exposed. The phenolic component of the thermosol has been pointed out to be important in this regard as well as lending stiffening properties of a desirable and generally indeterminant character. In addition the identically same lamina that provides the adhesion between laminas and internal stability can also provide a working face and vice versa. This working face even lends itself to grinding when desired to achieve very exacting caliper.

Further, the flexibility of the manufacturing procedure provided is very great. Rolls of compressible material coated with gelled but unset thermosol can be prepared in advance and then variously combined to meet order needs on a tailer made basis. In addition multiple plies may be secured together and the whole composite cured in a single pass over a curing drum. This inventory requirements, labor productivity, plant space productivity and energy productivity are greatly increased.

It has been found in printing test runs that when the thermosol coating overlies the compressible lamina so that the thermosol lamina is engaged either with the drawsheet or with the back of the material that is being printed, the composite is extremely resistant to sinking over a long life, providing an unexpectedly superior printing press packing. Even more importantly, the print quality is superior—sharp and clear. While the compressible lamina provides good compressibility in the printing element, its compressible performance is enhanced by the thermosol work surface of the present invention compared to any of the prior art facings, in ways not entirely understood. Furthermore, the integrity of the laminate is excellent.

No present day press packing offers such superior printing performance and long life or such superior adaptability to the simplest type of assembly of a basic component into a multi-ply composite.

It will be obvious to those skilled in the art that various changes a modifications may be made in the invention without departing from its true spirit and scope. It is, therefore, aimed in the appended claims to cover all such equivalent variations, as fall within the true spirit and scope of the invention.

It is claimed:

1. A printing element comprising a resilient compressible press packing comprising a compressible lamina having voids and a lamina consisting essentially of a solid heat set thermosol comprising heat set polyvinyl plastisol, phenolic resin and polyacrylate monomer.

2. The resilient compressible press packing of claim 1 wherein said voids of the compressible lamina comprise at least about 20% of the volume of said lamina and said thermosol lamina has a tensile stress of at least about 800 psi.

3. The resilient compressible press packing of claim 1 wherein said thermosol's polyvinyl plastisol content is about 30 to about 95% and polyacrylate monomer content is about 2 to about 20% by weight.

4. The resilient compressible press packing of claim 1 wherein said thermosol lamina forms the outer working face for said press packing.

5. The resilient compressible press packing of claim 1 comprising a woven lamina over said compressible lamina opposite said thermosol lamina.

6. The resilient compressible press packing of claim 5 comprising a pressure sensitive adhesive over and in direct contact with said woven textile opposite said compressible lamina.

7. The resilient compressible press packing of claim 1 comprising a second lamina on the opposite side of said thermosol lamina from the first said compressible lamina.

8. A printing element consisting of a resililent compressible press packing laminate comprising a highly porous compressible lamina at least 10 mils thick and a solid thermosol lamina at least 2 mils thick comprising about 70 to about 95% by weight of polyvinyl plastisol about 8 to about 15 percent by weight phenolic resin and about 3 to about 10% acrylate crosslinked with said polyvinyl forming a thermoset polymer, said press packing being resistant to collapse of said porosity over long usage.

9. A printing element comprising a resilient compressible press packing comprising a compressible lamina having voids and a lamina consisting essentially of a solid heat set thermosol comprising heat set polyvinyl plastisol and polyacrylate monomer wherein the polyvinyl plastisol content of said thermosol is about 30 to about 95% and the polyacrylate monomer content is about 2 to about 20% by weight and wherein said compressible lamina comprises a fibrous sheet impregnated with an impregnant comprising an epoxy resin and said thermsol comprises about 2 to about 30% by weight phenolic resin.

10. The resilient compressible packing of claim 9 wherein the polyvinyl plastisol content of said thermosol is about 70 to about 90%, the polyacrylate monomer content is about 3 to about 10% and the phenolic content is about 8 to about 15% by weight.

11. The resilient compressible press packing of claim 9 comprising a second lamina on the opposite side of said thermosol lamina from the first said compressible lamina wherein said second lamina is a second compressible lamina and said compressible lamina is in direct face to face contact with the first said thermosol lamina, and said resilient compressible press packing comprising a second thermosol lamina in direct face to face contact with said second compressible lamina, and a third compressible lamina in direct face to face contact with said second thermosol lamina.

12. The resilient compressible press packing of claim 11 comprising a woven lamina in face to face engagement with the third compressible lamina opposite the second thermosol lamina.

13. The resilient compressible press packing of claim 11 comprising a third thermosol lamina in face to face engagement with the third compressible lamina opposite the second thermosol lamina and forming an outer working face for the resilient compressible press packing.

14. The resilient compressible press packing of claim 11 wherein said thermosol in each thermosol lamina comprises about 70 to about 90% by weight polyvinyl chloride plastisol, about 3 to about 10% by weight polyacrylate monomer, about 8 to about 15% by weight phenolic resin and about 0.01 to about 1% by weight of a peroxide free radical initiator; and each compressible lamina having voids is a highly porous felted fibrous sheet impregnated with an impregnate comprising epoxy resin.

15. A printing element consisting of a resilient compressible press packing comprising a highly porous compressible lamina at least 10 mils thick and a solid thermosol lamina at least 2 mils thick comprising about 70 to about 95% by weight of polyvinyl plastisol and about 3 to about 10% acrylate crosslinked with said polyvinyl forming a thermoset polymer, and a second highly porous compressible lamina at least 10 mils thick on the opposite side of said solid thermosol from the first said highly porpous compressible lamina said thermosol lamina being a single ply in direct contact with each of said highly porous compressible laminas and forming the sole means securing said three laminas together, said press packing being resistant to collapse of said porosity over long use.

16. The press packing laminate of claim 15 wherein both said highly porous compressible laminas are comprised of fibrous material impregnated with an impregnant comprising an epoxy resin and said plastisol comprises a phenolic resin of the thermosetting two-step type present in an amount of about 8 to about 15% by weight.

* * * * *